United States Patent [19]

Townsend

[11] 4,179,682
[45] Dec. 18, 1979

[54] TILT COMPENSATION FOR ACOUSTIC TRANSDUCING SYSTEM

[75] Inventor: Robert L. Townsend, Amherst, N.H.

[73] Assignee: Sanders Associates, Inc., Nashua, N.H.

[21] Appl. No.: 930,824

[22] Filed: Aug. 3, 1978

[51] Int. Cl.² ............................................. G01S 3/80
[52] U.S. Cl. .................................... 367/135; 367/121
[58] Field of Search .................. 340/3 PS, 16 R, 6 R; 343/5 ST

[56] References Cited

U.S. PATENT DOCUMENTS

| 3,178,679 | 4/1965 | Wilkinson | 340/3 PS |
|---|---|---|---|
| 3,870,989 | 3/1975 | Mallet | 340/6 R |

*Primary Examiner*—Richard A. Farley
*Attorney, Agent, or Firm*—Louis Etlinger; Richard I. Seligman

[57] ABSTRACT

A tilt compensated transducer array is provided with omni-directional transducers, compensated bi-directional transducers, and a processor which forms omni and bi-directional beams that are combined to cancel image lobes to give the array a uni-directional characteristic in which but a single, steerable main lobe is formed over a board range of steering angles. When the elements are located along a flexible line about which they naturally twist, a pair of orthogonally oriented bi-directional transducers is tilt or twist compensated to make image lobe cancellation possible. This is done by a compensator at each pair of bi-directional transducers which modifies their outputs in accordance with the deflection angle from the local vertical so as to obtain an output signal substantially the same as would be obtained by a single, properly oriented bi-directional transducer. Additionally, the use of a tilt compensated element permits discrimination of long range targets from short range targets.

8 Claims, 23 Drawing Figures

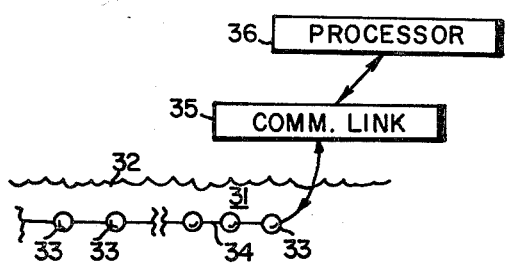
FIG. 1
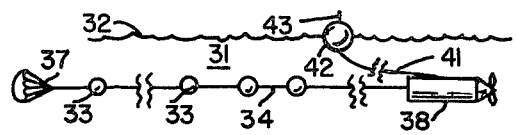
FIG. 2.
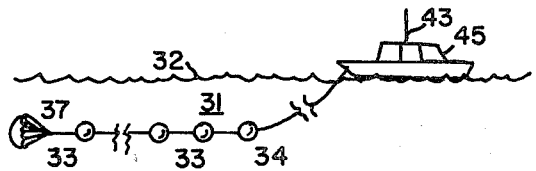
FIG. 3.
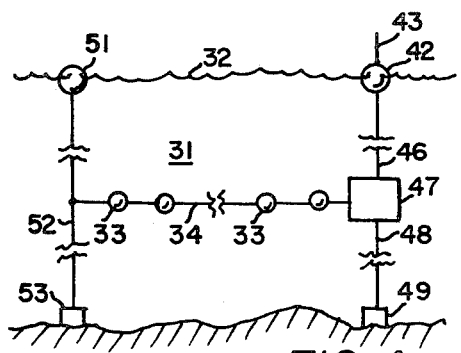
FIG. 4.
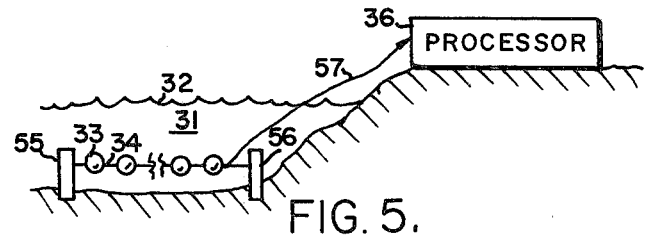
FIG. 5.
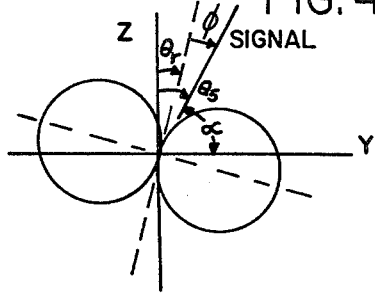
FIG. 10.
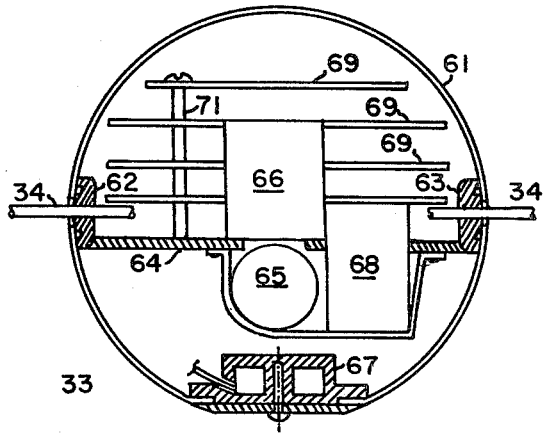
FIG. 6.
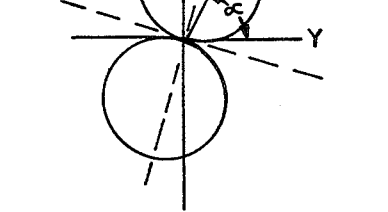
FIG. 11.
FIG. 9.
FIG. 8.
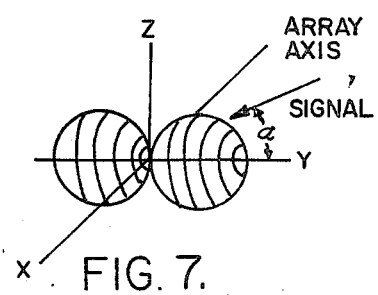
FIG. 7.

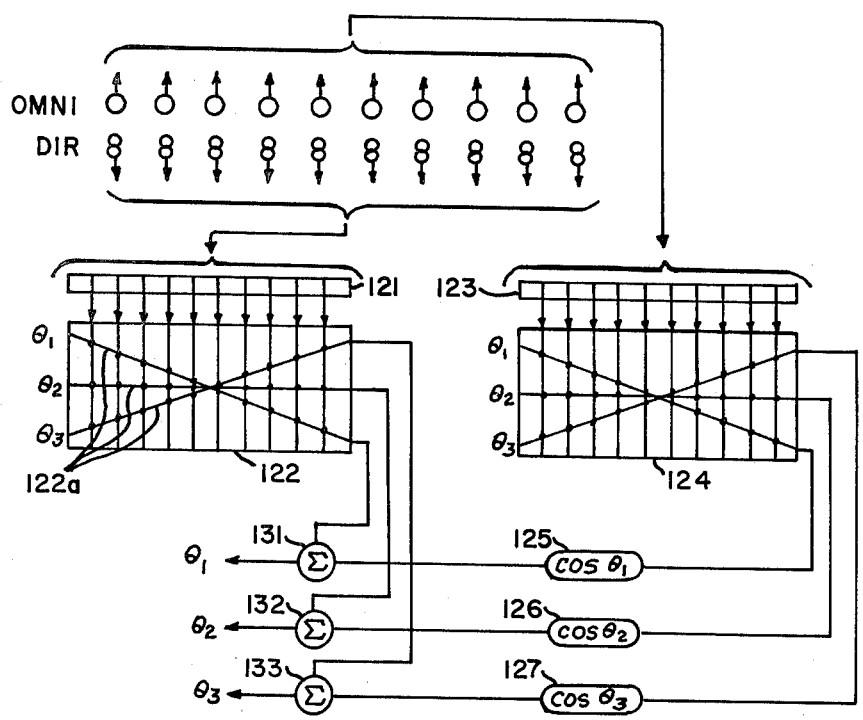
FIG. 17.
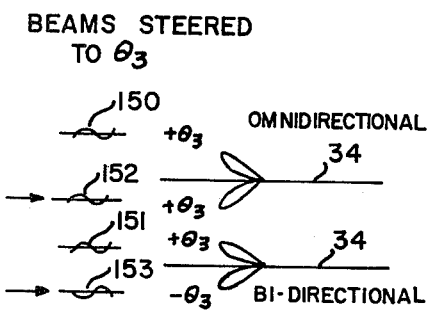
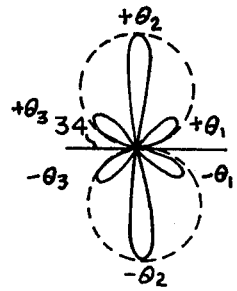
FIG. 18 a.  FIG. 18 b.
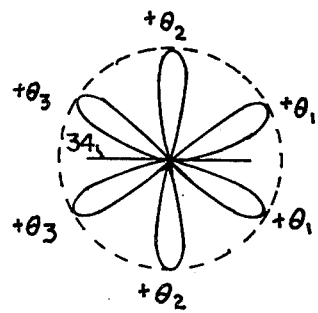
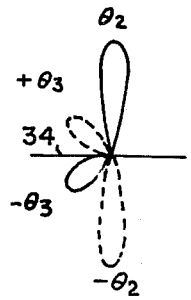
FIG. 19.  FIG. 20.

TILT COMPENSATION FOR ACOUSTIC TRANSDUCING SYSTEM

FIELD OF THE INVENTION

This invention relates in general to underwater acoustic devices and more particularly to unique orientation-compensated elements.

BACKGROUND OF THE INVENTION

While this invention relates to tilt compensated acoustic transducers, a special type linear array which employs these transducers will first be described along with the background for these acoustic arrays.

Underwater surveillance systems for determining the direction from which acoustic signals arrive at a listening station unambiguously, are well known. Ambiguities are resolved by resorting to special types of array configurations and/or processing. Two examples of such systems are described in U.S. Pat. No. 3,870,989 issued to Alfred L. Mallet on Mar. 11, 1975, and U.S. Pat. No. 3,987,404 issued to Thomas E. Woodruff on Oct. 19, 1976. Each of these patents describe a sonobuoy utilizing two bi-directional transducers, an omni-directional transducer and a compass. Signals from these components are processed by additional equipment, and the direction from which the acoustic signals are arriving is determined.

The single sonobuoys described by the above-mentioned patents are eminently satisfactory for the relatively short range operation for which they are intended. However, there is also a need for a different kind of system, one having longer range, a greater sensitivity, and a high signal-to-noise ratio and a sharper directivity. Such a system could be obtained by an array of many elements exhibiting a response pattern comprising a single, narrow beam, preferably steerable at least in one plane. Usually, this plane is the horizontal plane since signals from distant targets essentially arrive in the horizontal plane.

One approach to the problem would be to construct a two-dimensional, or even a three-dimensional array of transducers, each omni-directional, bi-directional, or uni-directional, together with suitable beam-forming equipment. However, when the frequency of the sounds of interest and their wavelength in water is considered, the difficulties in constructing and deploying arrays of sufficient size make this approach to the problem unattractive.

In another approach, a "line" array of "omni-directional" transducers could be utilized with beam forming equipment to provide a response pattern having a set of narrow lobes with the narrow lobes being formed in the phasing and summation process utilized in the beam forming.

In this type system the beam is normally a cone-shaped beam, not only with a main lobe formed in one direction, but an "image" lobe is also formed in a different direction, such that it is impossible to tell from which direction an incoming signal is received. Thus, when utilizing a string of omni-directional elements, there is an ambiguity in determining the direction of the incoming signals.

It is possible with properly aligned "bi-directional" elements to sum their outputs so as to provide beam steering. However, the result of the above process nonetheless results in a main lobe and an image lobe. Thus, directional ambiguities occur.

Image Beam Cancellation

By way of background, it has been found that directional ambiguities can be resolved by effectively forming two beams from an in-line array of elements. One beam is formed from omni-directional transducers, and the other beam is formed from bi-directional transducers. Image beam cancellation is made possible because of a characteristic of bi-directional transducers in which signals arriving at the transducer from one direction result in output signals which are out-of-phase with those which are a result of the same signal coming in from a diametrically opposite direction. Thus, for a given beam steering angle, it has been found that the omni and directional beams have lobes on one side of the array, the signals in which are in-phase; and lobes on the other side of the array, the signals in which are out-of-phase with each other. Image lobe cancellation is accomplished by adding the out-of-phase signals together.

These two beams are formed by providing a string of in-line elements, each of which contains an omni-directional transducer and a properly oriented bi-directional transducer. Processing of the outputs from the omni-directional transducers with one beam former forms omni-beam lobes and processing the outputs of the bi-directional transducers with another beam former forms bi-directional beam lobes. The image lobe cancellation is accomplished by summing out-of-phase signals in the lobes of the two beams on the same side of the array. For complete cancellation over large steering angles, the amplitude of the omni beam lobes is adjusted for the desired beam steering angle by multiplying signals in this omni beam lobe by the cosine of the beam steering angle. With a sufficient number of elements this entire process results in a uni-directional acoustic transducer array in which but one single steerable main lobe or beam is formed and in which an array gain improvement of 3 dB is achieved.

The above beam forming operating assumes the proper alignment of all of the bi-directional transducers in the string, e.g. they must all have the same orientation.

However, in normal operation the acoustic transducing elements are connected with flexible cables and the transducers twist or rotate during operation. This twist or tilt can degrade or defeat the image beam cancellation process. Note: Tilt is not a problem for the omni-directional transducers.

Tilt Compensation

It is one feature of the subject invention that pairs of orthogonally oriented bi-directional transducers are substituted for the single bi-directional transducer in each element. Each pair of transducers is provided with a tilt compensator which provides an output signal substantially identical to that which would be expected from a single, properly oriented bi-directional transducer.

Thus, for non-rigid towed systems, the twist compensation permits proper functioning of the beam forming processors such that a uni-directional single lobe main beam can, in fact, be formed.

The compensation takes place at each transducer element in that each of the bi-directional transducers is connected to a vertical reference compensator containing an inertial device for measuring the deflection angle between the local vertical and the transducer reference direction. The compensators modify the outputs of the directional transducers, in one embodiment through the use of sine and cosine potentiometers connected to the inertial device, such that when the outputs from the compensators are summed, the output signal is substantially the same as would be obtained by a single, properly oriented bi-directional transducer. Thus, the compensated bi-directional transducers and an omni-directional transducer form a unique element, which when used in a non-rigid array, permit "image" beam cancellation, elimination of directional ambiguity, and improve gain due to the single lobe formation. Such elements, in effect, synthesize a rigid array electronically and are thus called "synthesized" elements.

In view of the ability to produce a single, uni-directional beam, it is also possible to provide a multi-unambiguous beam system by combining a composite set of unambiguous beams each steered in a particular direction and each with its image lobe cancelled.

Range Discrimination

In addition to the ability to generate an unambiguous beam in a horizontal direction, it is also possible with tilt compensation to generate a tilt compensated vertical dipole beam in which the outputs of the bi-directional transducers, instead of being multiplied by sine and cosine functions, are multiplied by −sine and by +cosine functions respectively.

Once having generated a vertically stabilized dipole pattern, and with or without a uni-directional horizontal beam, it is then possible to distinguish a long-range target whose sonic emissions arrive substantially in a horizontal plane from short range targets whose sonic emissions arrive from positions either above or below the horizontal plane. Thus, if the particular sonic information received is concentrated in the horizontal uni-directional beam, it can be ascertained that the target is at rather large distances from the array. On the other hand, with sonic emissions occurring mainly in the vertical cosine pattern, it can be deduced that these emissions are from targets or other sound producing sources which are at a relatively short range with respect to the array.

The reason that long range targets can be discriminated from short range targets is a phenomena in which sounds from a long range target arrive generally from the horizontal direction. This is true even with multi-path distortion in which sounds from a distant target are reflected from the ocean bottom or from the ocean surface, or even from the boundary layers between thermally different portions of the ocean. Without vertical stabilization, it will be appreciated that it would be impossible to detect the difference between long range and short range targets by this method.

It is, therefore, a general object of the subject invention to improve underwater acoustic arrays and transducing systems.

A more specific object is to provide an improved underwater acoustic transducer system incorporating an array of unique "synthesized" elements.

Briefly stated, a system utilizing these unique elements can be in the form of a uni-directional array which forms but a single, steerable main lobe and includes a string of elements, each of which includes an omni-directional transducer and a pair of bi-directional transducers. A beam former is provided for the outputs of the omni-directional transducers and a beam former is provided for the outputs from the bi-directional transducers. Means are then provided for selectively cancelling "image lobes" by combining selected outputs of the omni-directional beam former and the directional beam former. Of course, the more elements in the array, the narrower will be the beam formed and the higher will be the gain. Also, the more elements, the more successful will be the image beam cancellation over wider steering angles. Thus, image beam cancellation substantially increases array gain especially with large numbers of elements. In the system described, a processing unit beam forms the set of omni-directional outputs into a typical conical beam which contains an unwanted image beam in the horizontal plane. The processing unit also beam forms the set of bi-directional outputs into a semi-conical beam, and combines this semi-conical beam with the conical beam formed from the omni-directional outputs so as to cancel the unwanted image beam. This combination is performed so as to provide an independent unambiguous horizontal beam. The system can be configured to provide either a single, steerable unambiguous beam or a set of fixed preselected unambiguous beams, or a combination of both.

As can be seen, the present invention includes the concept of generating either a single, steerable beam or selected multiple, unambiguous beams by use of unique "synthesized" elements. Each synthesized element compensates for transducer tilt (rotation around the array cable axis) and provides an omni-directional output and a bi-directional output which simulates the lobes of a properly oriented bi-directional transducer.

Tilt compensation includes the concept of allowing the transducers to twist or rotate with the cable but then compensating for such twist or rotation. More specifically, in one embodiment the synthesized element combines the outputs of two bi-directional transducers substituted for one properly oriented transducer. The pair of bi-directional transducers is mounted with their maximum response axes perpendicular to each other and to the predetermined horizontal array axis about which they may rotate with respect to the output of a vertical reference device, so as to establish a response pattern which is substantially the same as that of a single stationary, bi-directional transducer. Such spatial stabilization of the response pattern makes feasible a beam steering system using a multi-element array, each synthesized element of which comprises a pair of beam stabilized bi-directional transducers and an omni-directional transducer. Preferably, the outputs of all the pairs of bi-directional transducers are combined, the outputs of all of the omni-directional transducers are combined, and then both combined outputs are further combined to form the desired lobe response pattern. Steering is accomplished by the beam former in the usual fashion for both the omni-directional and the compensated bi-directional sets of outputs.

More particularly, one embodiment of an unambiguous acoustic transducer array incorporating the present invention comprises first and second bi-directional electro-acoustic transducers each having a maximum response axis, means for mounting said transducers with said maximum response axes perpendicular to each other and to a predetermined substantially horizontal axis about which they may rotate, and a compensator including a vertical reference device for measuring the deflection angle between the vertical and a reference direction fixed with respect to said transducers, and also including means for modifying the outputs of said transducers by functions of said deflection angle and combining such modified outputs so as to obtain an output signal corresponding to a response pattern having either a single axis of maximum response or preselected multiple axes of maximum response, and which pattern does not vary substantially with rotation of said transducers about said predetermined axis.

One embodiment of an unambiguous transducer array incorporating the present invention comprises a plurality of the subject synthesized elements joined together electrically and mechanically by a flexible multi-conductor cable and arranged, when said cable is extended, to form a linear array of elements with said cable as its axis, each of said elements including first and second bi-directional electro-acoustic transducers each having a maximum response axis and being mounted with said maximum response axes perpendicular to each other and perpendicular to said array axis, about which they may rotate, each of said elements also including a vertical reference device fixedly mounted with respect to said transducers for measuring the deflection angle between the vertical and a reference direction on said device, each of said elements also including an omni-directional electro-acoustic transducer said system also including a processor and a communication link cooperating with said cable for transmitting signals between each of said elements and said processor, said processor including a beam former utilizing said signals for forming beams making any desired angle with said array axis, each beam having a major lobe on but one side of said array axis.

In a further embodiment, long range targets may be discriminated from short range targets by generating either a vertically stabilized dipole pattern beam or both a narrow horizontally stabilized beam and a vertically stabilized dipole pattern beam. It is then possible to distinguish long range targets from short range targets by establishing the existence of signals in one or the other of the beams. The above-mentioned tilt compensators can be utilized in the generation of a tilt-compensated, vertically-oriented dipole pattern utilizing standard bi-directional transducer elements. The outputs of these elements are fed respectively to a −sine multiplier and a cosine multiplier, the outputs of which are summed as described hereinbefore in connection with the "synthesized elements". Thus, it will be appreciated that the outputs of the aforementioned first and second bi-directional acoustic transducers may be utilized for two purposes in that they may be utilized in the formation of the unambiguous horizontal beam as well as in the formation of the vertically oriented dipole beam.

DESCRIPTION OF PREFERRED EMBODIMENT

For a clearer understanding of the present invention, reference may be made to the following detailed description and the accompanying drawings in which:

FIGS. 1, 2, 3, 4, and 5 are schematic diagrams illustrating an array of elements deployed in the water;

FIG. 6 is a schematic cross-sectional diagram illustrating the principal components of one element of an array;

FIG. 7 is a pictorial sketch illustrating the three-dimensional response pattern of a compensated bi-directional acoustic transducer suitable for use in the present invention;

FIG. 8 is a schematic symbol frequently used to indicate a bi-directional transducer;

FIG. 9 is a schematic symbol frequently used to indicate an omni-directional transducer;

FIGS. 10 and 11 are schematic diagrams useful in explaining the invention;

FIG. 17 is a schematic diagram illustrating a preferred form of beam-former;

FIGS. 18a, 18b, 19 and 20 are schematic diagrams of response patterns, or beams, and are useful in explaining the invention.

DETAILED DESCRIPTION

Figure 12:
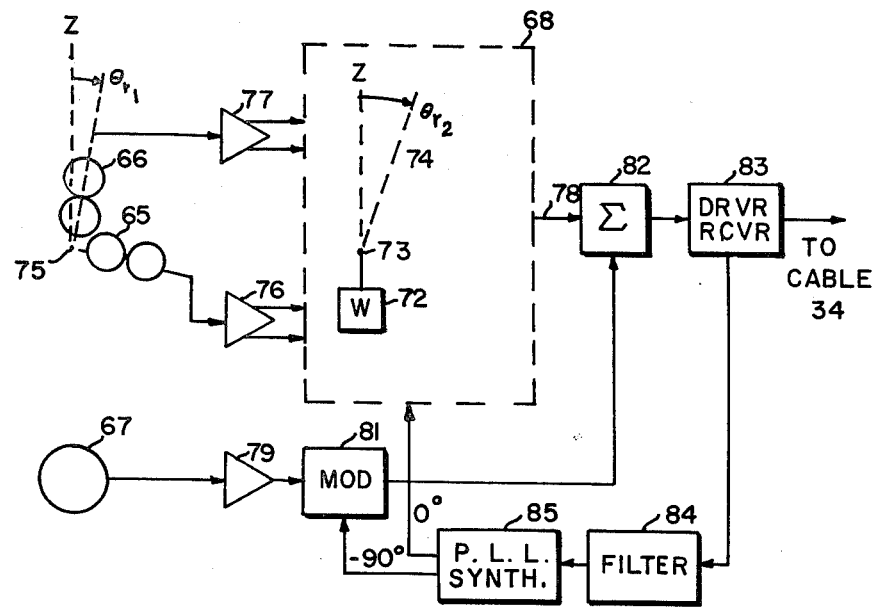
FIG. 12 is a schematic block diagram illustrating one element of an array in accordance with the invention.

While the subject invention may be used with non-linear arrays, such as "Y"-configured arrays, for simplicity, the following describes the use of the subject invention in a linear array.

Referring first to FIG. 1, there is shown a linear array indicated generally by the reference character 31 which is deployed beneath the surface 32 of the sea. The array 31 comprises a plurality of elements 33 joined to each other electrically and mechanically by means of a multi-conductor cable 34. The cable 34 is connected to a communication link 35 by means of which signals are transmitted between the array 31 and a processor 36. The communication link 35 may, in some cases, be simply a cable and in other cases, may comprise one or more radio transmitters and receivers. The processor 36 includes various components for controlling the array 31, for forming beams, and for receiving and analyzing signals from the array. The processor 36 may be located at any various places, such as, on a surface ship, an aircraft, or at a shore station.

FIG. 2 shows one way the array 31 may be deployed. One end of the cable 34 may be connected to a drogue 37 while the other end is connected to a thruster or tug 38 which pulls the array to a straight position against the drag of the drogue 37. Another cable 41 is connected within the tug 38 to the cable 34 and leads to a surface float 42. The float 42 could contain the processors 36 which could include a tape recorder, but in most cases, it will be preferred that the float 42 contain a radio transmitter by which signals are radiated by means of an antenna 43 to the remotely located processor 36.

FIG. 3 shows another arrangement for deploying the array 31. Instead of the tug and surface float, the array is towed by a surface vessel 45.

FIG. 4 shows an arrangement in which the array 31 is fixed in position. The surface float 42 is connected by means of a cable 46 to a subsurface float 47 which, in turn, is connected by means of another cable 48 to a weight or anchor 49 resting on the bottom of the sea.

Another surface float 51 is connected by means of a cable 52 to a weight or anchor 53 which also rests on the bottom of the sea. One end of the cable 34 is connected to an intermediate portion of the cable 52 while the other end of the cable 34 is connected to the subsurface float 47. Signals are transferred between the array 31 and the sub-surface float 47 which may, in some cases, contain electronic components such as amplifiers, modulators and the like to assist in the flow of the signals in both directions.

FIG. 5 shows an arrangement which sometimes may be preferred in shallow water near the shore. Opposite ends of the cable 34 are fastened to posts 55 and 56 which are embedded in the bottom of the sea. A cable 57 leads directly from cable 34 to the processor 36.

In each of FIGS. 1–5, only a few elements have been illustrated. However, it will be understood that an actual array may comprise dozens or even a hundred or more elements and that the entire array may be hundreds or thousands of feet long. Under such conditions it has been found that the cable 34 inevitably twists and rotates. The problem is especially noticeable in the case of the self-propelled and towed arrays of FIGS. 2 and 3, but in all cases, due to the length of the array, twist and/or rotation is a phenomenon which must be dealt with. If all of the transducers in the elements 33 were omni-directional transducers then twist could be tolerated. However, as previously noted, the shape of beams formed from omni-directional transducers are far from ideal. If the sharp characteristics of directional transducers are to be utilized, then some way must be found to cope with the rotation of the cable. One approach might be to have some sort of a sensor which would sense the angle of the transducer and transmit it to the processor where the calculations could take account for such position. Another approach might be to physically stabilize the position of the transducers. Another approach, which is the approach taken in the present invention, is to allow the transducers to rotate about the array axis physically, but to compensate electrically for such rotation so that it is possible to obtain an output signal from each element which is substantially the same as that which would be obtained from a directional transducer which is fixed in position. It has been found that rotation about an axis perpendicular to the array axis is negligible.

Referring now to FIG. 6, there is shown a schematic cross section of one of the elements 33 of the array. Each element includes an outer shell 61 which in this example is substantially spherical, typically made of aluminum. Typically, at diammetrically opposite points within the shell are gland seals 62 and 63 which seal apertures in the shell through which the cable 34 passes. A main structural member 64 supports a framework and many of the components. Bi-directional transducers 65 and 66 are generally cylindrical in exterior shape and are mounted with their cylindrical (maximum response) axes perpendicular to each other and perpendicular to the axis of the array, which, at this point, is the axis of the cable 34. A bi-directional transducer, for the purposes of this application, is one exhibiting a plane of minimum response to incident energy and an axis of maximum response perpendicular thereto and with similar response characteristics on opposite sides of the plane. Such response characteristics may vary depending upon the particular type of bi-directional transducer. One widely used variety of transducers is the pressure gradient transducer which generates a signal in accordance with the component of motion in the maximum response axis direction. One example of this is a transducer having a coil of wire resiliently mounted within a magnetic field. Transducers 65 and 66 are preferably of this type and the axis of the moving coil is coincident with the cylindrical axis of the housing, which axis is the axis of maximum response. Assuming that FIG. 6 is a vertical section, then the transducer 65 would have its maximum response in the horizontal direction while the transducer 66 would have its maximum response in the vertical direction. Upon the arrival of a pressure wave, the entire shell 61 is displaced to and fro in the direction of the wave, but the coils of the transducers, because of their resilient mounting and their inertia tend to remain stationary and therefore, having a voltage induced therein. Although but two directional transducers have been illustrated in FIG. 6, in some cases, if there is room within the shell 61, it may be advantageous to use two (or more) additional transducers, one mounted parallel to transducer 65 and one mounted parallel to transducer 66. The pairs of transducers which are mounted parallel to each other may be connected in series or in parallel depending upon the voltage and impedance levels which it is desired to present to the electronics. However, for present purposes, it will be assumed that there are but two transducers.

Also mounted within the shell 61 is an omni-directional electro-acoustic transducer 67, the response of which to pressure waves is substantially independent of the direction from which the wave arrives. A piezoelectric transducer is preferred at present for this application although other kinds may be used. Also supported by the structural member 64 is a compensator 68 which includes a vertical reference device. As will be more fully explained, the purpose of the compensator is to modify the outputs of the directional transducers 65 and 66 so as to compensate for rotation of the element 33 about the array axis. A number of circuit boards 69 are mounted by means of one or more posts 71 to the structural member 64 and are for the purpose of mounting the various electronic components and circuits connected therewith.

As previously mentioned, it is preferred that the transducers 65 and 66 be electrodynamic transducers as discussed above. These transducers have a response pattern such that the magnitude of the signal is approximately proportional to the cosine of the angle between the axis of maximum response and the direction from which the pressure wave arrives. FIG. 7 illustrates such a response pattern schematically. In this figure, the X-axis is the array axis and it is assumed that the transducer is positioned with its center at the origin and with its axis of maximum response coincident with the Y-axis. Such a transducer so positioned exhibits a minimum or null response to signals arriving in or parallel to the X-Z plane and exhibits a maximum response to signals arriving along or parallel to the Y-axis. Signals arriving from other directions have a magnitude proportional to the cosine of the angle $\alpha$ which is the angle between the Y-axis and the direction from which the signal is arriving. As shown, such a response pattern resembles two adjacent spherical shells on opposite sides of the X-Z plane and with their diameters coincident with the Y-axis.

Bi-directional electro-acoustic pressure gradient transducers as discussed above, are sometimes indicated schematically simply as two small circles tangent to each other as illustrated in FIG. 8. Similarly, an omnidirectional transducer may be indicated schematically as a single circle as shown in FIG. 9.

TILT COMPENSATION

Referring now to FIG. 10, a transducer such as the transducer 65 is positioned so that its maximum response axis is tilted with respect to the Y-axis or, what is the same thing, its null plane is tilted with respect to the Z-axis (which is vertical) by an angle $\theta_r$. Let it be assumed that a signal is arriving in the Y-Z plane making an angle $\alpha$ with the axis of maximum response or, what is the same thing, making an angle $\phi$ with the null plane, where $\phi = 90° - \alpha$. Denoting the response of this transducer to any signals as $e_1$, and the response to a signal along the maximum response axis as $e_m$, then:

$$e_1 = e_m \sin \phi \qquad \text{Eq. 1}$$

It is convenient to measure all angles from the vertical. Denoting the angle between the vertical and the signal direction as $\theta_s$, it is obvious that:

$$\phi = \theta_s - \theta_r \qquad \text{Eq. 2}$$

Equation 1 may then be rewritten as:

$$e_1 = e_m \sin(\theta_s - \theta_r) \qquad \text{Eq. 3}$$

Refering now to FIG. 11, there is shown schematically a transducer such as the transducer 66 positioned perpendicular to the transducer 65 so that its maximum response axis makes an angle $\theta_r$ with the Z-axis. Again, it is assumed that the same signal arrives making an angle $\theta_s$ with the Z-axis. Denoting the response of this transducer as $e_2$, it is apparent that:

$$e_2 = e_m \cos(\theta_s - \theta_r) \qquad \text{Eq. 4}$$

Let us now multiply $e_1$ by the cosine of $\theta_r$ and multiply $e_2$ by the sin of $\theta_r$ denoting the products as $E_1$ and $E_2$ respectively. From Equations (3) and (4):

$$E_1 = e_m \sin(\theta_s - \theta_r) \cos \theta_r \qquad \text{Eq. 5}$$

$$E_2 = e_m \cos(\theta_s - \theta_r) \sin \theta_r \qquad \text{Eq. 6}$$

Denoting the sum $E_1$ and $E_2$ by $E_0$, it is found by applying trigonometric identities and simplifying that:

$$E_1 + E_2 = E_0 = e_m \sin \theta_s \qquad \text{Eq. 7}$$

From Equation 7 it is seen that it is possible to compensate for the twist or rotation of the transducers about the array axis and to obtain a compensated bi-directional element pattern with its maximum response axis in the horizontal independent of the deflection angle $\theta_r$ of the assembly reference position away from the vertical. It is also noted that the resulting response is the same as that of a single transducer which is stationary and parallel to the Y-axis.

Although the foregoing analysis has assumed that the signal arrives in the Y-Z plane, it can be shown that the pattern stability achieved is independent of the signal arrival angle.

FORMATION OF COMPENSATED VERTICALLY-ORIENTED LOBES

It is also noted that if we were to multiply $e_1$ by the sine of $\theta_r$ and $e_2$ by the cosine of $\theta_r$ (instead of as was done above) to obtain $E_1$ and $E_2$, and then subtract the resulting $E_1$ from $E_2$, then Equation 7 would be replaced by:

$$E_2 - E_1 = E_0 = e_m \cos \theta_s \qquad \text{Eq. 8}$$

Equation 8 shows that it is also possible to compensate for twist or rotation about the array axis to obtain a compensated bi-directional element pattern with its maximum response axis oriented vertically, independent of the deflection angle $\theta_r$ of the assembly reference position away from the vertical. An array of vertically stabilized bi-directional patterns is thus possible using this invention. The use of this vertically oriented pattern will be discussed hereinafter with respect to distinguishing long range from short range targets.

TILT COMPENSATORS

Referring now to FIG. 12 shown schematically are the two transducers 65 and 66 mounted with their maximum response axes perpendicular to each other and perpendicular to the array axis 75 and tilted slightly so that the maximum response axis of the transducer 66 makes a deflection angle $\theta_{r1}$ with the vertical or Z-axis. The outputs of the transducers 65 and 66 are amplified by amplifiers 76 and 77 respectively and passed to the compensator 68. The compensator 68 includes several components, as will be more fully explained, one of which is a vertical or intertial reference device comprising a weight 72 mounted on a shaft 73 which measures continuously the angle $\theta_{r2}$ between the vertical and a reference direction 74 on the compensator. As shown in FIG. 6, the compensator 68 is mounted on the same framework as the transducers 65 and 66 so that they rotate together about the array axis 75. The reference direction on the vertical reference device need not be parallel to the axis of maximum response of either of the transducers 65 and 66 which means that $\theta_{r2}$ may be different from $\theta_{r1}$. Such an arrangement would be useful if it were desired to make the maximum response axis of the transducer combination 65-66 inclined with respect to the horizontal (or vertical). However, in most cases it is preferred that the reference direction be parallel to one of the axes of maximum response or, in other words, that $\theta_{r1} = \theta_{r2}$. For illustrative purposes it will be assumed that this is so and this deflection angle will be denoted simply as $\theta_r$.

The compensator 68, in addition to measuring the angle $\theta_r$, also performs a number of other functions, namely, that of modifying the amplified outputs of the transducers 65 and 66 by functions of $\theta_r$, modulating the signals, and adding the signals, although these functions are not necessarily performed in that order. It will be appreciated that, in the general case, the functions of $\theta_r$ by which the outputs of the transducers are modified will depend upon the response patterns of the transducers being used. In the preferred embodiment being described, wherein the response patterns are cosine functions as previously explained and illustrated, the amplified outputs of the transducers 65 and 66 are multiplied by the cosine and sine respectively of $\theta_r$. Specific examples of suitable components and circuits will be fully discussed. In any event, the output of the compensator which appears on the conductor 78 is a carrier frequency modulated by $E_0$ as specified in Equation 7. In one example, this signal may be converted to a suppressed carrier double sideband AM signal having a phase angle of 90° with respect to the processed output of the omni-directional transducer.

The output of the omni-directional transducer 67 is amplified by an amplifier 79 and passed to a modulator 81 the output of which is fed to a summing circuit 82, the other input to which is the output of compensator 68 on conductor 78. Modulator 81 in one embodiment may be a suppressed carrier double sideband AM unit in which the signal is shifted 90° in phase with respect to the signal on conductor 78. The output of the summing circuit 82 is passed to a driving and receiving circuit 83 which contains the necessary components to transmit the output of the summing circuit 82 to the cable 34 and eventually through the communication line 35 to the processor 36. The circuit 83 also contains the components necessary to receive a signal from a tone generator located in the processor 36. This signal may be a tone in the audio frequency range and is passed through a bandpass filter 84 to a phase-locked loop (PLL) synthesizer 85. The synthesizer 85 acts as a source of carrier frequency voltage because it multiplies the frequency of the audio tone and generates therefrom a radio frequency carrier having a frequency which is unique for each one of the elements 33 in the array. The synthesizer 85 has a first output, designated 0°, which is passed to the compensator 68 and used to modulate the outputs of the directional transducers 65 and 66 as will be more fully explained. The synthesizer 85 also generates another signal at the same frequency but displaced in phase 90° therefrom which is fed to the modulator 81 so as to modulate the amplified output of the omni-directional transducer 67. As previously noted, the output of the modulator 81 is fed to the summing circuit 82 where it is added to the output of compensator 68, the sum being passed to the circuit 83. The system thus described can in one embodiment constitute a double sideband quadrature separated AM modulated signalling system.

Figure 13:
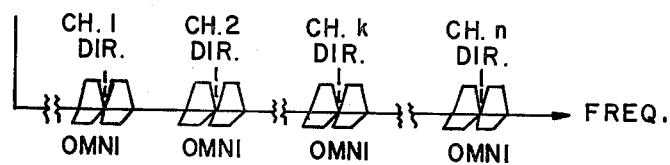
FIG. 13 is a schematic diagram illustrating a preferred form of modulation.

FIG. 13 shows schematically the signals from a double sideband AM modulated system in which the omni and directional channels are quadrature separated as seen by the trapezoidal frequency envelopes. The output signal from each element is at a different carrier frequency as shown. The signals from each element are designated as a channel. The PLL synthesizer in each element generates a carrier at a different frequency. For example, the element at one end of the array can be designated channel 1 and its signals are modulated at a first carrier frequency. The combined signal from the two directional transducers is modulated with a phase designated 0° while the signal from the corresponding omni-directional transducer is modulated at the same frequency but with a signal whose phase is displaced by 90°. The next element, channel 2, is similarly modulated but at a second frequency. In this way, the signals from all of the elements are transmitted to the processor in such a way that they can be recovered and separated from each other for processing.

Figure 14:
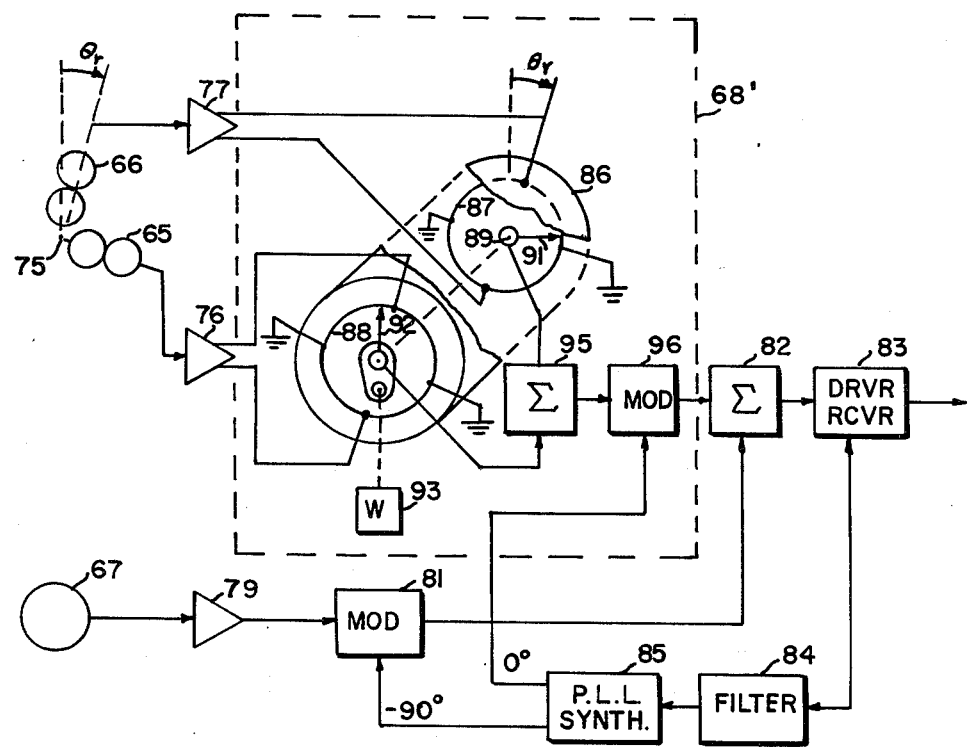
FIG. 14 is a schematic block diagram, similar to FIG. 12, illustrating one form of compensator.

FIG. 14 shows one embodiment of a compensator, designated in this figure as 68' to distinguish it from the generalized showing in FIG. 12. The compensator 68' includes an assembly commonly referred to as a set of sine-cosine potentiometers. Such an assembly is a well-known item and comprises a frame or body 86 on which are mounted two circular resistances 87 and 88 each tapped at four equally spaced points around the circumference and provided with a shaft 89 on which are mounted wiper arms 91 and 92 respectively which are rotatable together with respect to the resistances. The body including the resistances 87 and 88 is fixedly mounted with respect to the shell 61 (FIG. 6) so that the resistances rotate with this shell, with the cable 34, and with the transducers 65 and 66. A vertical reference device, comprising a weight 93 mounted on the shaft 89, is provided to hold the shaft 89 and the wiper arms 91 and 92 in the same preselected position relative to the vertical despite any rotation of the resistances 87 and 88. The output of the amplifier 77 is connected in push-pull fashion to two diametrically opposed points on the resistor 87. The diameter through these points is a reference direction and the angle between the vertical and this reference direction, designated the deflection angle, $\theta_r$, is indicative of the amount of twist or rotation of the device. The other two taps of the resistance 87 are grounded. Similarly, the output of the amplifier 76 is connected to diametrically opposed points on the resistance 88, the diameter between which points is parallel to the previously mentioned reference direction with respect to the resistor 87. Similarly, the remaining two taps are grounded. The taper, or variation, in the resistance between adjacent points is selected, along with the relative positions of the wiper arms 91 and 92, so that the output voltage on the wiper arm 91 is proportional to the output of the amplifier 77 multiplied by the sine of the angle $\theta_r$, while the output voltage on the wiper arm 92 is proportional to the output of the amplifier 76 multiplied by the cosine of the angle $\theta_r$. The voltages on the wiper arms 91 and 92 are added in a summing circuit 95 the output of which is applied to a double sideband suppressed carrier modulator 96 which, in turn, is supplied with a carrier frequency at 0° by the PLL synthesizer 85.

Figure 15:
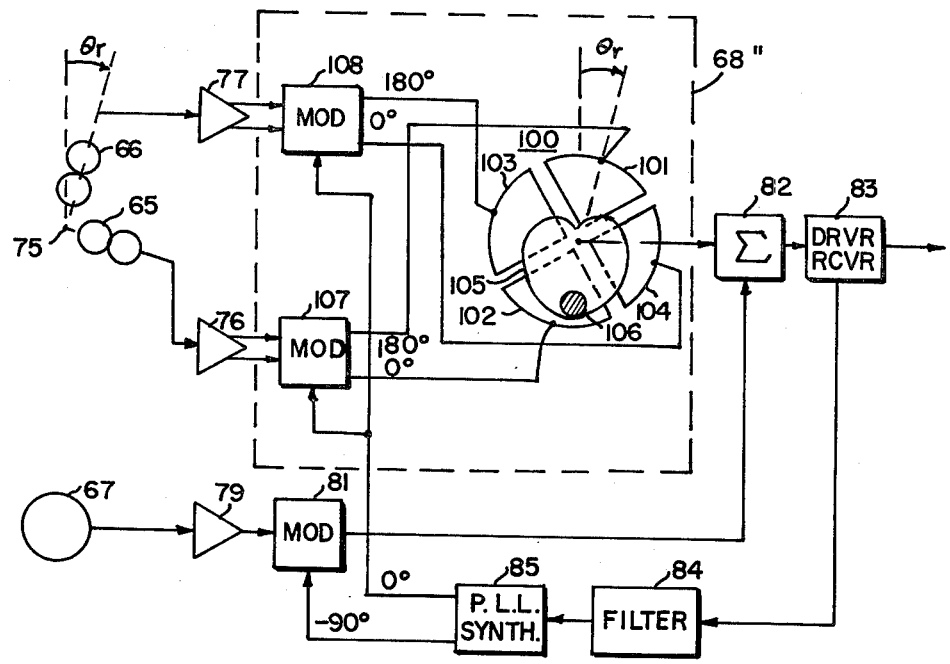
FIG. 15 is a schematic block diagram, similar to FIGS. 12 and 14, illustrating another form of compensator.

FIG. 15 shows a preferred embodiment of compensator, designated 68' in this figure. There is shown a capacitor goniometer similar in some respects to the compass described in U.S. Pat. No. 3,264,554. However, in the present case there is no magnet but instead a weight. More specifically, there are shown four similar capacitor plates arranged symmetrically about a common axis and arranged in first and second diametrically opposite pairs. The first pair comprises plates 101 and 102. The second pair comprises plates 103 and 104. Each plate is in the shape of a sector of a circle and the plates are arranged beside each other in one plane. These plates are shown schematically in FIG. 15 but it will be understood that they are fastened to a frame so that they rotate with the shell 61 (FIG. 6), the cable 34 and the transducers 65 and 66. A line through the center of the plates 101 and 102 and through the center of the assembly is designated the reference direction and is shown in FIG. 15 as making an angle $\theta_r$ with the vertical. Mounted adjacent to these plates and rotatable with respect thereto about their common axis is a cardioid shaped plate 105. A weight 106 constituting a vertical reference device is fastened to the plate 105 at the lower end as viewed in FIG. 15 so that gravity will keep the plate 105 in the position shown despite rotation of the four sector shaped plates. The output of the amplifier 76 is connected to a double sideband suppressed carrier amplitude modulator 107 which is supplied with carrier frequency at a phase designated 0° by the PLL synthesizer 85. Similarly, the output of the amplifier 77 is connected to a similar modulator 108 which is also supplied with the same carrier frequency at the same phase. The output of the modulator 107 is connected push-pull fashion to the plates 101 and 102 while the output of the modulator 108 is similarly connected to the plates 103 and 104. The goniometer 100 performs the dual function of multiplication and addition. It multiplies the output of the modulator 107 by the cosine of $\theta_r$, it multiplies the output of the modulator 108 by the sine of $\theta_r$ and adds the two products. The output is taken from the cardioid shaped plate 105 and passed to the summing circuit 102. The remainder of the circuit is as previously described in connection with FIG. 12.

It is to be noted that in the discussion in connection with FIG. 12 it was pointed out that the compensator 68 not only measures the angle $\theta_r$, but also performs the functions of multiplication, addition and modulation but not necessarily in that order. In the embodiment shown in FIG. 14, that is, the embodiment using the sine-cosine potentiometers, the amplified output of the transducers 65 and 66 is first multiplied by the cosine and sine of the angle $\theta_r$, then the two products are added and finally the sum is modulated. In the embodiment of FIG. 15 which is the embodiment preferred at present, the outputs of the amplifier 76 and 77 are first modulated and then applied to the goniometer 100 which performs the combined function of multiplying the outputs of the modulators by the cosine and by the sine of the deflection angle and also of adding these products. In all three cases the result is the same, that is, the output applied to the summing circuit 82 is a modulated signal, the amplitude of which varies with the direction of arrival of the signal but is substantially independent of the angle the transducers make with the vertical.

SIGNAL TRANSMISSION, BEAM FORMING AND SWEEPING

As mentioned, once it is possible to simulate a fixed bi-directional element, then a single main lobe can be formed through the use of omni-directional transducers and processing which generates an appropriate amplitude lobe from the outputs of these omni-directional transducers. This lobe, when subtracted from the unwanted lobe from the bi-directional transducers, results in the cancellation of unwanted lobe so as to achieve a single main lobe. This lobe may then be steered as described below.

It should be recognized that in a preferred embodiment two beams are formed, and this is the key to easy image beam cancellation. It is possible to preprocess each element's output at the element. However, the multi-plexing problems in doing this are excessive. In the preferred embodiment, all processing is done at one place on the compensated signals from each element. Thus, a string of compensated bi-directional elements and a string of omni-directional elements are used to produce a bi-directional beam and an omni-directional beam. A beam former is used for each set of elements to provide a bi-directional beam steered in a given direction, and amplitude adjusted lobes from the beam from the omni-directional transducers, steered in this direction. The amplitude adjusted lobe of the steered omni-beam corresponding in direction to the image lobe of the bi-directional beam is selected to cancel the image lobe. Cancellation takes place because the signals in the omni-directional beam are out-of-phase with those of the corresponding image lobe in the bi-directional beam.

Figure 16:
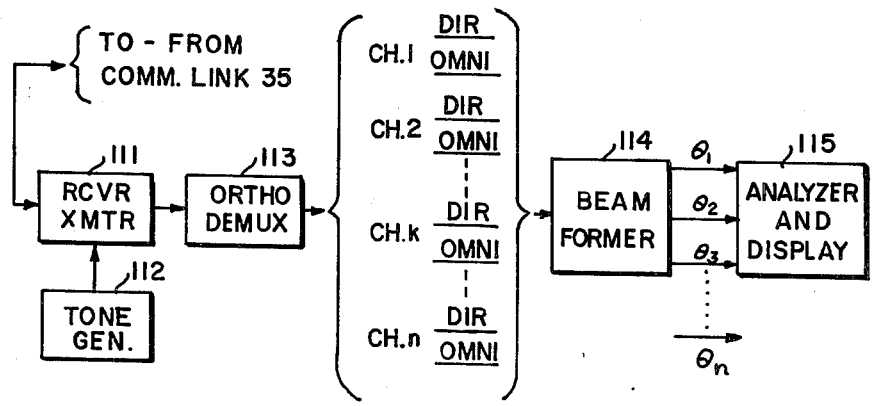
FIG. 16 is a schematic block diagram illustrating a processor in accordance with the invention.

More specifically, FIG. 16 illustrates one form of the processor 36. Included is a receiver transmitter 111 which is connected to the communication link 35. The form of the receiver transmitter 111 will depend upon the nature of this communication link. The purpose, in general, of the transmitter portion is to transmit a tone from a tone generator 112 to each of the elements 33. The tone generator may be one which generates an audio tone for example in the neighborhood of 600 or 1200 hz. The purpose of the receiver portion is to recover the signal schematically illustrated at FIG. 13. Depending upon the nature of the communication channel 35, this signal may or may not be modulated on a further carrier, but in any event, the output of the receiver transmitter 111 should be the signal shown in FIG. 13. This signal is passed to a conventional orthogonal frequency de-multiplexer 113 which recovers and separates the signals into channels, one channel for each of the elements 33 of the array.

The signal for each channel comprises two parts. The first is the signal from the bi-directional transducers which, as previously discussed, is substantially the same as would be obtained from a single bi-directional transducer which remained stationary in space despite rotation of the cable 34.

The other signal is the signal from the omni-directional transducer of each element 33. All of these signals are passed to a beam former 114 which can form a single beam or may form several beams either simultaneously or sequentially. The beams so formed are passed to an analyzer and display device 115 where the signals are analyzed and displayed as desired.

FIG. 17 illustrates in block diagram form a preferred form of beam former. It will be described as if the array were composed of only ten elements. The signals from the directional transducers of each element are fed to a conventional scaling and suppression network 121 which selects the relative amplitude of the various elements so as to reduce the amplitude of the sidelobes. From the network 121 the signals are passed to a delay and memory network 122 which may contain conventional tapped delay lines 122a as shown. These tapped delay lines introduce a suitable phase shifts to form beams. The formation of three beams is illustrated, making angles of $\theta_1$, $\theta_2$, and $\theta_3$ with the array axis. The lobes formed are generally cone shaped and extend around the array axis. However, as shown in FIG. 18a, signals in one lobe (at for instance $+\theta_3$) are out of phase with signals in the image lobe ($-\theta_3$). This finding makes possible image lobe cancellation and will be described later. Note, as shown in FIG. 18b, the amplitude of the lobes formed from the bi-directional transducers vary with the cosine of the steering angle $\theta$.

Referring back to FIG. 17, the signals from the omni-directional transducers are fed to another conventional scaling and suppression network 123 where relative amplitudes are selected to reduce sidelobes. The signals are then passed to another delay and memory circuit 124 similar to circuit 122 to form lobes at the same angles $\theta_1$, $\theta_2$, and $\theta_3$. These lobes are generally cone shaped, extending completely around the array axis, and all have the same amplitude and the same phase as illustrated in FIG. 19.

IMAGE BEAM CANCELLATION

For image beam cancellation, referring back to FIG. 18a, it can be seen that at any given steering angle, signals 150 in the omni-directional beam on one side of the array axis are in-phase with signals 151 in the bi-directional beam on this same side of the array axis; while signals 152 in the omni-directional beam on the other side of the array axis are out-of-phase with signals 153 in the bi-directional beam on this other side. This is due to the nature of bi-directional transducers. Thus, it is possible to cancel the image lobes by summing signals 152 and 153. The in-phase condition is indicated by a plus sign and the out-of-phase by a minus sign. It will be appreciated that with respect to FIG. 18a, both the bi-directional and omni-directional beams are steered in a given direction $\theta_3$. It will also be recalled that, as illustrated in FIG. 18b, the amplitude of the bi-directional beam varies with the angle it makes with the array axis, and is greatest for a broad side beam.

It can thus be seen that it is possible to select which of these lobes from the omni-directional transducers are to be subtracted from the lobes from the bi-directional transducers to enhance the lobes on one side while substantially eliminating the lobes on the other side of the array. However, inspection of FIGS. 18b and 19 shows that for best results, it is necessary to scale the amplitude of the lobe from the omni-directional transducers in order to substantially equalize the two sets of lobes. It has been found as part of this invention, that the scale factor is the cosine of the steering angle.

It is thus a finding of this invention that amplitude adjustment can be made exceptionally simple by the use of cosine weighting circuits 125, 126 and 127, with $\theta_s$ corresponding to the angles of the three beams illustrated. In one embodiment these may be conventional cosine potentiometers whose weighting function is set to the particular beam angle $\theta$. The use of cos $\theta$ weighting eliminates the necessity of complicated lookup tables and computer controlled phase shifters.

The lobes from the directional transducers and the lobes from the omni-directional transducers are combined in summing circuits 131, 132, and 133. Lobes on either side of the array axis can be selected by properly choosing the sign of the signals summed. A typical result is shown in FIG. 20 which shows a broadside lobe at angle $\theta_2$, with all other lobes cancelled in the processing. This is possible since all lobes to be subtracted from unwanted lobes of the bi-directional transducers can be generated from the omni-directional transducers. In FIG. 20 the dotted lobe is the cancelled lobe. In like manner, a lobe on the other side of the array at an angle $\theta_3$ may also be selected by proper cancellation lobe selection.

Instead of the arrangement described above it would be possible to combine the signal from each omni-directional transducer with that of its associated directional transducers as modified by the compensator 68 so as to form a limacon response pattern for each element; that is, a pattern for each element which has a principal lobe on but one side of the array. The limicon response pattern is different from that described above only in that the one principal lobe is developed on an element-by-element basis instead of after combining the outputs of numbers of elements. Such combination could be made either in each element or at the processor. Then, at the processor, the so-modified signals from each element could be formed into one or more beams at various angles. Another possibility would be to provide circuitry in each element to combine the signal from the omni-directional transducer with that of the directional transducers as modified by the compensator 68 and such a way as to form a single beam on the left side of the array and also form a single beam on the right side of the array and then to transmit these signals to the processor for further beam forming. Perhaps the most general alternative would be to transmit from each element the signal from each of the directional transducers, the signal from the omni-directional transducer, and a signal indicative of the deflection angle to the processor where all of the compensation and beam forming would take place. Variations in the array itself are also possible. For example, the elements 33, instead of all being substantially the same, could be of two kinds, one comprising an omni-directional transducer alone and the other comprising the two bi-directional transducers and the vertical reference device. Additionally, it is to be remembered that although the invention has been described as applied to receiving apparatus, the principles are also applicable to the transmission of signals. Similarly, the principles are applicable not only to underwater situations but also to transmission and reception in air. However, it is believed at present that the invention will have its widest application in the field of underwater signal receiving apparatus.

LONG RANGE VERSUS SHORT RANGE DISCRIMINATION

Figure 21:
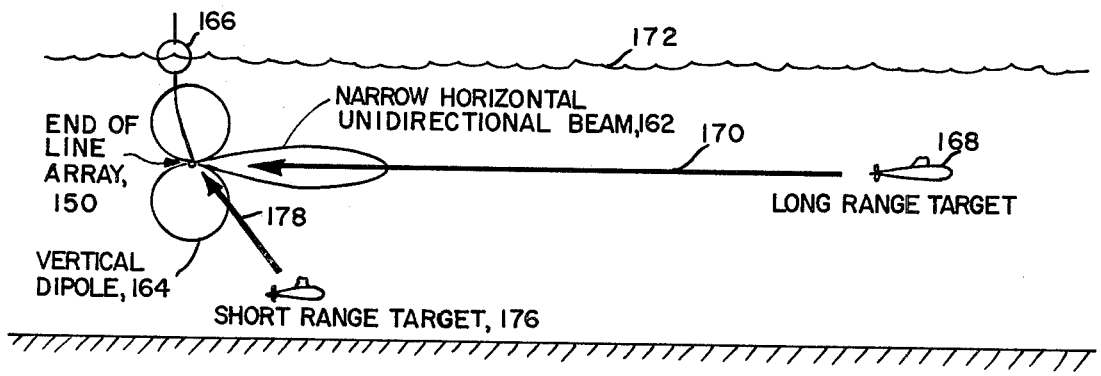
FIG. 21 is a diagram showing the production of dipole and uni-directional beams to distinguish long range versus short range targets.
Figure 22:
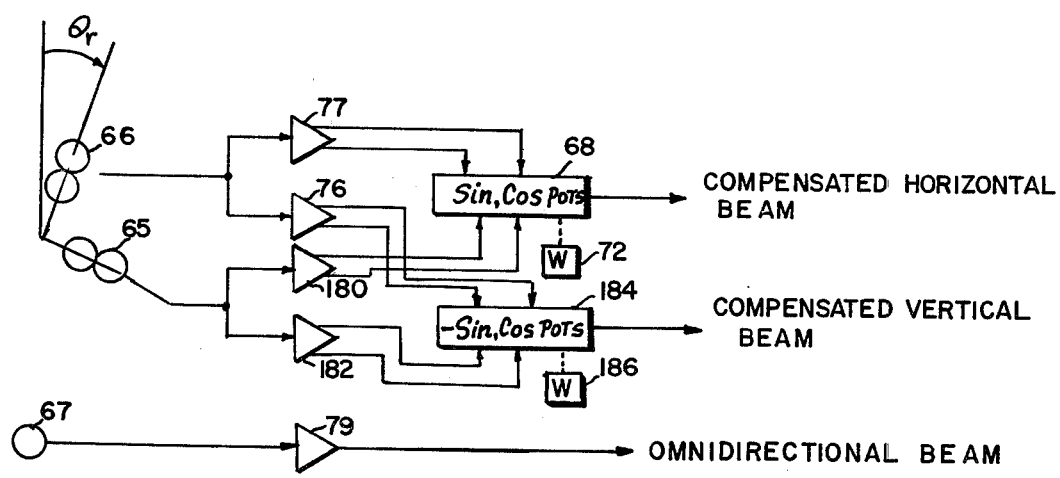
FIG. 22 is a schematic block diagram showing apparatus to generate the tilt-compensated vertical and horizontal beams illustrated in FIG. 21.

Referring now to FIG. 21, a typical situation is illustrated in which the end of a line array 150 is shown having receiving patterns in the form of a narrow, horizontal uni-directional beam 162 and a vertical dipole beam 164. The narrow horizontal uni-directional beam is identical to that described hereinabove and is generated in the same manner. The generation of the vertical dipole beam 164 will be described in connection with FIG. 22. In the embodiment shown, the line array is connected to a surface buoy 166 which transmits signals from the line array to a central processing station remote from the buoy.

In this embodiment a long range target such as illustrated at 168 may be quite far away from line array 160. As described hereinbefore, it is a phenomena of long range targets that all acoustic energy therefrom appears to come in on a horizontal plane. The arrival of this energy in this direction as illustrated by arrow 170 is, in part, due to the long distances, in which signals which are initially reflected from either the surface 172 of the ocean or its bottom 174 are attenuated. As noted hereinbefore, signals reflected within boundary layers produced by different temperature zones within the ocean are also confined over long distances to the horizontal direction. It will therefore be appreciated that if the target is at some distance from the line array, its signal energy will occupy only the narrow horizontal beam and very little, if any, energy will be found in the vertical dipole beam.

On the other hand, with a target in the near field as illustrated by short range target 176, energy from this target will arrive at the line array at some angle to the horizontal as illustrated by arrow 178. It will therefore be appreciated that the energy from the short range target will be concentrated in one of the two lobes of the dipole pattern. By comparison of the energy in the horizontal beam with that in the dipole beam, it can be determined whether the target is at some long range from the array or within some well defined short range of the array.

It will be appreciated from inspection of FIG. 21 that the horizontal uni-directional lobe indicates a rather high sensitivity in the horizontal direction, whereas the dipole pattern has nowhere near the gain indicated by the uni-directional pattern. This adds to the ability to distinguish between long range targets and short range targets, since the dipole transducers will only pick up short range targets. With this disparity in gain, a second degree of discrimination is added to the system.

In order to compensate the outputs of the dipole transducers so as to simulate a vertical dipole pattern, it is necessary to compensate for tilt angle $\theta_r$. It turns out as a matter of convenience that the same bi-directional transducer elements can be utilized with the same type of potentiometers and summing circuits so as to provide a compensated vertical beam as well as a compensated horizontal beam. In this sense, transducers producing the patterns 65 and 66, while they may be utilized to provide compensated horizontal beams which are then given a uni-directional characteristic, may also be simultaneously utilized to form a compensated vertical beam. As illustrated in FIGS. 12 and 14, the output from bi-directional transducers may be fed to a compensator 68 which includes sine and cosine potentiometers connected to a weight 72 which establishes the local vertical. The output of this unit is essentially a compensated, bi-directional horizontal beam which, when properly processed, produces a uni-directional horizontal compensated beam. On the other hand, the same outputs from the transducers which give the response pattern 65 and 66 may be coupled through amplifiers 180 and 182 to a unit 184 which includes −sine and cosine potentiometers connected to a weight 186 which likewise defines the local vertical. The only difference between unit 184 and unit 68 is that the connections to the potentiometers are such that the leads from one bi-directional transducer are reverse-connected to the aforementioned sine potentiometer (making it a −sine potentiometer). When the outputs of the −sine and cosine potentiometers are summed, the output is a compensated vertical beam with a dipole pattern. This pattern duplicates that which would ordinarily be associated with a bi-directional transducer having its axis of maximum sensitivity perfectly aligned in the vertical direction.

Of course, in order to establish an unambiguous horizontal beam, the omni-directional beam is formed as described hereinbefore in that the transducer producing the pattern 67 is applied to an amplifier 79 which amplifies its output. The output of the omni-directional transducer when appropriately combined with the outputs from other omni-directional transducers permits formation of the compensated unambiguous horizontal beam.

With the system described above, the direction of the target in the horizontal plane may be unambiguously determined and its range may be ascertained within certain limits by virtue of the relative amplitudes of the signal in the narrow horizontal uni-directional beam as compared to that in the vertical dipole beam.

It will be appreciated that if it is not desirable to know in which horizontal direction the target is located, then the subject system may be utilized without the uni-directional horizontal beam forming apparatus, but with tilt-compensated bi-directional transducers to indicate whether a long range or short range target is in the vicinity of the line array. In fact, for short range target detection, it is not necessary to generate any horizontal beam. Thus, the bi-directional transducer outputs need only be multiplied by $-\sin\theta$ and $\cos\theta$ to produce only the compensated vertical dipole pattern beam.

It will be appreciated that the direction of long range targets may be ascertained through the aforementioned steering of the narrow horizontal uni-directional beam. It will likewise be appreciated that the vertical dipole beam may be transformed into a narrow steerable vertically compensated beam pointing both upwardly or downwardly by utilization of conventional beam steering apparatus. This involves the utilization of a number of bi-directional elements, the compensated outputs of which are delayed and summed in a conventional beamformer. Thus, the direction of short range targets may be obtained during the sweep of the narrow vertical beam. An additional advantage is that most of the distant shipping noise arriving on the horizontal is eliminated.

Of all of the various alternatives, the arrangements specifically described are preferred at present. However, all of the alternatives mentioned are perfectly workable variations and many more will occur to those skilled in the art. Accordingly, it is desired that the protection afforded by Letters Patent be limited only by the true scope of the appended claims.

What is claimed is:

1. An acoustic transducer system comprising first and second bi-directional electro-acoustic transducers each having a maximum response axis, means for mounting said transducers with said maximum response axes perpendicular to each other and to a predetermined axis about which they may rotate, and a compensator including a vertical reference device for measuring the deflection angle between the vertical and a reference direction fixed with respect to said transducers and also including means for modifying the outputs of said transducers by functions of said deflection angle and for combining such modified outputs so as to obtain an output signal corresponding to a predetermined response pattern which does not vary substantially with rotation of said transducers about said axis.

2. The system of claim 1 wherein said modifying and combining means modifies said outputs to obtain a response pattern having but a single axis of maximum response.

3. The system in accordance with claim 1 in which said reference direction is parallel to one of said maximum response axes.

4. The system in accordance with claim 1 in which said means for modifying comprises a set of sine-cosine potentiometers including a body fixedly mounted with respect to said transducers and including a shaft on which are mounted two wiper arms for rotation with respect to said body and in which said vertical reference device includes a weight mounted on said shaft for maintaining said shaft and said wiper arms in the same angular orientation despite rotation of said body.

5. The system in accordance with claim 4 which includes first and second amplifiers connected to amplify the outputs of said first and second transducers and to apply the outputs so amplified to said set of sine-cosine potentiometers so that said amplified outputs are multiplied by the sine and the cosine respectively of said deflection angle to obtain first and second products.

6. The system in accordance with claim 5 in which said reference direction is parallel to said maximum response axis of said first transducer and which includes means for connecting said sine-cosine potentiometer so as to multiply the amplified output of said first transducer by the sine of said deflection angle and for multiplying the amplified output of said second transducer by the cosine of said deflection angle.

7. The system in accordance with claim 5 in which said means for combining comprises a summing circuit for adding said first and second products to obtain a single output.

8. The system in accordance with claim 7 which includes a source of carrier frequency voltage and means for modulating said carrier frequency voltage with the ouput of said summing circuit.

* * * * *